EXALTED-CARRIER TELEVISION RECEIVER

Filed Feb. 7, 1950 2 Sheets-Sheet 1

INVENTOR.
MURRAY G. CROSBY
BY
Lippincott & Smith
ATTORNEY

EXALTED-CARRIER TELEVISION RECEIVER

Filed Feb. 7, 1950 2 Sheets-Sheet 2

INVENTOR.
MURRAY G. CROSBY
BY
Lippincott & Smith.
ATTORNEY

United States Patent Office 2,738,380

Patented Mar. 13, 1956

2,738,380

EXALTED-CARRIER TELEVISION RECEIVER

Murray G. Crosby, Hicksville, N. Y.

Application February 7, 1950, Serial No. 142,863

10 Claims. (Cl. 178—5.8)

This invention relates to television apparatus and is concerned particularly with the form of receiver instrumentality used to recreate the television image and to reproduce the accompanying sound from received signal energy.

According to present standards of television transmission, the video information is transmitted as an amplitude modulation of a selected carrier frequency and the sound information is transmitted as a frequency modulation of a second selected carrier frequency spaced at a fixed frequency separation (by present standards 4.5 megacycles) from the video signal carrier. In such type of operation the video and audio signals are customarily received in a suitable selecting circuit and there converted into intermediate frequencies for amplification. In some forms of receivers the intermediate frequency video and audio signals are separated immediately following conversion to intermediate frequency and separately amplified and detected. Other forms of signal receivers now commonly known as the inter-carrier variety amplify the video and the audio intermediate frequency signals in a common intermediate frequency amplifier. Then, following amplification and detection, the audio signals can be separately detected by detecting the beat frequency existing between the audio and the video carriers since the frequency modulation introduced upon the audio carrier in transmission will then appear as a frequency modulation of the beat frequency developed between the video and the audio carriers.

Where television signals of the form above outlined are transmitted, the video information is transmitted according to the so-called vestigial side band transmission methods, by which substantially all of the upper side band is transmitted and in which the lower side band is partially attenuated at the transmitter to be radiated only in part. Under such circumstances receivers for television are accordingly customarily so designed that at the video carrier the response of the receiver is down 50 per cent or, in other words, the response is down 6 db. This generally means that the signal to noise ratio at the carrier is not as favorable to reception as are other parts of the system. Accordingly, the present invention has as one of its principal aims and objectives that of improving the reception of the video portion of the television signal to attain as one of its results a more favorable signal to noise ratio.

The prior art has already disclosed that improvements in the signal reception of other forms can be had by the so-called exalted carrier method reception. This invention seeks to utilize in unique fashion methods generally related thereto and to apply the exalted carrier form of reception particularly to television signals.

Through the introduction of exalted carrier techniques, television reception is in many respects simplified and many advantages are obtainable. Such knowledge of exalted carrier reception as exists carries into many receivers which were used primarily with a view to improving reception of ionosphere transmissions involving multipath propagation. It has been found in the art that multipath transmission effects were generally responsible for selective fading. The most destructive effect of selective fading is the fading of the carrier frequency with respect to the side bands. Through the use of exalted carrier methods of reception, the prior art has shown that the harmonic distortion due to carrier fading is substantially eliminated by filtering the carrier frequency and then recombining it at a raised or exalted level with the received signals, or, in the alternative, by recombining the energies in a type of detector which inherently eliminates distortion due to carrier fading.

In a system of exalted carrier operation, the filtered and separated carrier energy when recombined with the unfiltered received signals is combined at a phase determined by a suitable phase adjuster and with an amplification regulated to a degree determined by the exaltation of the carrier which is desired.

The receiver apparatus set forth by the present disclosure is one wherein the exalted carrier type of selection adapts itself readily to the peculiar requirements of television reception of the form presently being used, and, accordingly, includes many novel features not heretofore known or recognized in prior forms of exalted carrier receivers.

Many new advantages are attained which are particularly significant with respect to television signal reception.

In the form of operation herein to be described, the signals received comprise, as above noted, the video signals appearing as amplitude modulations on one carrier and the audio signals appearing as frequency modulations on another carrier spaced at a fixed frequency separation from the video carrier. These signals are suitably selected and heterodyned to produce signals of intermediate frequency. The modulated intermediate frequency signals are then amplified to the extent desired prior to detection in a suitable signal detector.

The derived intermediate frequency signals are also supplied to a selection circuit which filters out the carrier frequency from the incoming signals as a whole. However, certain low frequency components tend to remain associated with the derived carrier and these signals can be used at a later point in the system. Selection of the carrier frequency is usually brought about under the control of a crystal filter network which is excited by the incoming signal frequencies. The derived carrier frequency energy is then suitably controlled in both phase and amplitude relative to the modulated intermediate frequency signals and then combined with the received intermediate frequency signals for detection.

Any amplification will depend upon the amount of exaltation of the derived carrier frequency which is desired. With this combination of modulated signals and the derived carrier effective, it results substantially in an addition of the energies of the two signals which then can be supplied concomitantly to a suitable detector from the output of which the video signals can be obtained to control image reproduction on a picture reproducing tube and from which the synchronizing signals may be suitably derived by known methods insofar as selection of the higher frequency line deflection signals is concerned. Likewise, the audio signal modulation may be derived in any known manner, such as by the normally used discriminator or the inter-carrier methods above noted.

Since low frequency modulation can be considered to be present along with the derived carrier, the low frequency or vertical synchronizing signals for controlling image reproduction are readily derived by rectification of this derived signal alone.

Likewise, according to the present invention, the derived carrier frequency signals may be combined according to automatic frequency control methods in a suitable differential or phase detector with the modulated intermediate frequencies. An automatic frequency control (AFC) voltage for controlling the R. F. channel selector is thus readily obtainable.

The rectification of the modulated intermediate frequenices and the separated carrier concomitantly supplied to the signal detector will provide suitable automatic gain control voltages which may be applied to various amplifiers of the system, such as any or all of the R. F. and the I. F. amplifiers.

With the foregoing in mind, it will be appreciated that if carrier exaltation is applied in television receivers a signal to noise ratio gain of approximately 6 db is obtained with respect to present existing standardized television receivers. It likewise will be appreciated from the foregoing that the receiver instrumentality hereinabove generally described is more readily tunable and the optimum picture will occur coincident with the maximum sound volume. This obviously is a particular advantage in any receiver system utilizing the inter-carrier method of sound reception because in the presently adopted receiver operations of the inter-carrier type the sound volume is usually not at a miximum when the optimum picture is obtained.

Also, the receiver arrangement herein described offers a considerably greater possibility of rejecting sound carrier interference which occurs under presently adopted standards as a 4.5 megacycle side band and offers the opportunity to provide for the sound rejection in the video amplifier only. Naturally, this insures higher picture fidelity because it is possible to adjust the intermediate frequency amplifier to a point where the sound may be passed at full amplitude and video frequencies also may be passed up to a frequency range of at least four megacycles, giving a selectivity of the maximum modulation frequency in the video amplifier.

Furthermore, the receiver instrumentality hereinabove referred to generally and which will be more specifically described at a later point in this disclosure, is so constituted that through the exalted carrier form of reception it is possible to substitute video selectivity for intermediate frequency selectivity which makes possible a rejection of adjacent channel interference through the use of video traps only. This, of course, naturally simplifies receiver circuits to a considerable extent.

By exalting the picture or video carrier, the video side bands are removed to a sufficient extent to require less limiting in the sound channel of any receiver using the inter-carrier type of sound reception. This also simplifies the receiver circuit to a considerable extent.

It has already been pointed out that the receiver herein to be described provides a simple form of automatic frequency control. This is advantageous because where a filtered carrier frequency is available an automatic frequency control based upon the picture carrier can be provided to insure a wider range of control. This is particularly adaptable to television in the U. H. F. (ultra high frequency) signal range, toward which design trends are moving. The automatic frequency control systems of the prior art have functioned largely upon the sound carrier and thus have tended to be so sharp that the tuning would often drift out of the range of the AFC system.

Still further, as was also pointed out above in the general description of the apparatus, the filtered carrier frequency provides modulation components of low frequency which include the vertical synchronizing pulses. Consequently, the detected output of the filtered carrier may be fed directly to the vertical synchronization circuits and provide a convenient method and means of separating vertical or field synchronizing pulses from the horizontal or line synchronizing pulses and thus insure a further simplification of the receiver circuits.

With the foregoing in mind, it will be appreciated that the invention has as some of its primary objects improving the signal to noise ratio in television reception; obtaining greater fidelity in picture reception by providing a higher degree of selectivity; substituting video selectivity for intermediate frequency selectivity; eliminating to a considerable extent the effects of interference from adjacent television channels through the use of simple trap circuits; simplifying the amount of limiting required in television receivers for producing the sound accompaniments; providing simplified means for deriving automatic frequency controls; and providing improved methods of selecting synchronizing signals from the combined video and synchronizing information supplied to the receiver.

Other and further objects of advantage in the invention will be those of improving fidelity of reception as well as reducing the cost of receiver components and assembly. Other objects will naturally follow and will be appreciated by those skilled in the art to whom the invention is directed.

The receiver of this invention has been illustrated in one of its preferred forms by the accompanying drawings and illustrative curves, wherein Fig. 1 shows generally the amplitude-frequency characteristic of television signals, transmitted according to present-day standards, as passed by the R. F. amplifiers of current types of receivers;

Figures 1, 2:
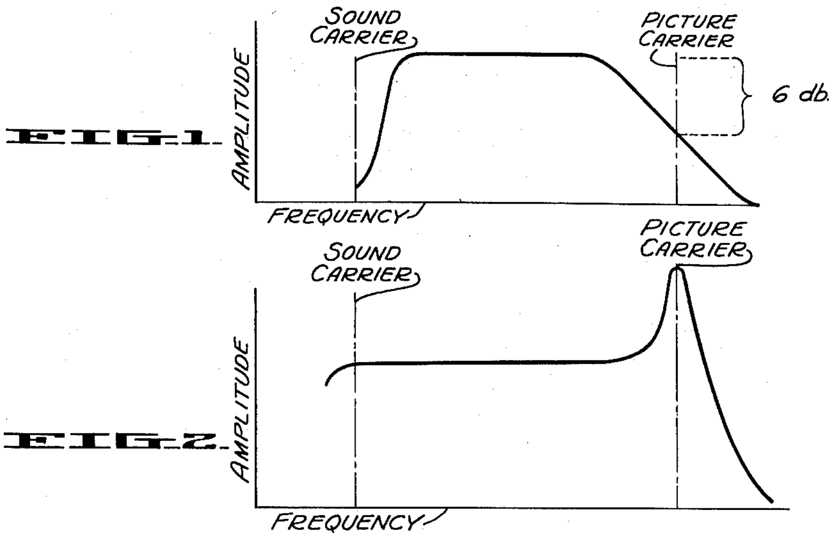
Fig. 2 is an illustrative curve of a television receiver operating under the exalted carrier filter proposal of this invention.

Referring now to the drawings and first to Fig. 1, it will be recognized that there has been illustrated the intermediate frequency selectivity characteristic of a conventional present-day television receiver wherein the video signals are received as amplitude modulations of the type known as vestigial side band transmissions. In this form of reception the picture carrier component is tuned to one side of the intermediate frequency selectivity curve, as illustrated. This side of the selectivity curve is normally adjusted to have a linear slope and the carrier is tuned, as indicated, to be 6 db down on this particular linear slope. For the lower modulation frequencies, corresponding to those side bands which are nearer the carrier, it can be seen that double side band amplitude modulation is received. However, for the higher modulation frequencies side bands on only one side of the video carrier are utilized.

Vestigial side band transmission of this type, of course, requires only slightly more than half the band width which would be necessary for double side band amplitude modulation to be utilized. Therefore, vestigial side band transmission methods allow higher picture fidelity over a given band width, but several disadvantages immediately manifest themselves in this conventional type of television reception. One of the more important of such disadvantages is that since the carrier is tuned so as to arrive at the detector attenuated by an amount of 6 db, it is immediately evident that a 6 db loss in signal-to-noise ratio is introduced. This is brought about because in the detection process the received signal is a beat frequency developed between the carrier and the side band frequencies and its amplitude is proportional to the product of the amplitude of the side band frequencies. Consequently, if the amplitude of the carrier is reduced by an amount of 6 db, the amplitude of the signal is reduced by the same amount. This effect is responsible for the observation often encountered in present-day television receivers in which it is found (particularly in the fringe areas of reception) that weak signals may be received with better picture quality when the picture carrier is tuned to the vicinity of the center, rather than near the edge, of the intermediate frequency selectivity curve. Making this type of selection tends to improve the video reception of the low frequency values but has the most disadvantageous effect of completely detuning the sound channel to the point where sound signals are often not obtainable at all, and, of course, another very troublesome effect immediately comes into being due to the fact that the high frequency response of the television picture as a whole is forthwith lost.

Figure 3:
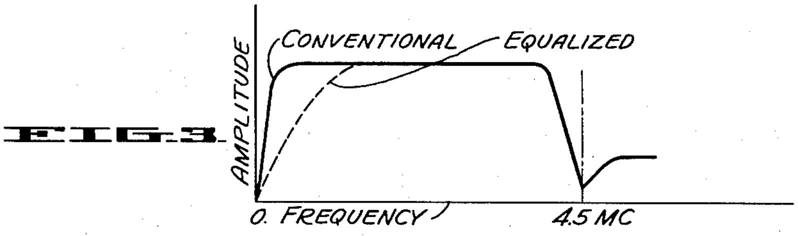
Fig. 3 is a curve to illustrate the method of equalizing the receiver response when signals are received according to the exalted carrier method.

Thus, the invention of the present disclosure seeks to provide, through the use of an exalted carrier method of reception, a receiver characteristic more in accordance with the showing of Fig. 2 where it is at once apparent that side band frequencies near the carrier will be exalted along with the carrier. Of course, to prevent over-emphasis in the receiver of these low frequencies, a compensating attenuation in the video amplitude is desirable which will reduce and equalize the characteristic of the receiver to provide a more nearly uniform and flat response extending from substantially zero frequency up to a frequency range of the order of four megacycles. The curve of Fig. 3 shows both the normal video amplifier characteristic and the equalized video amplifier characteristic. The characteristic shown by the dotted line labeled "equalized" emphasizes how the lower frequency response is attenuated to compensate for the over accentuation of the lower frequencies which pass the carrier exalting filter, as depicted by Fig. 2. The compensation provided by the over-accentuation of the carrier exalting filter and the equalizing network of the video amplifier tend to produce a flat over-all amplitude response.

Figure 4:
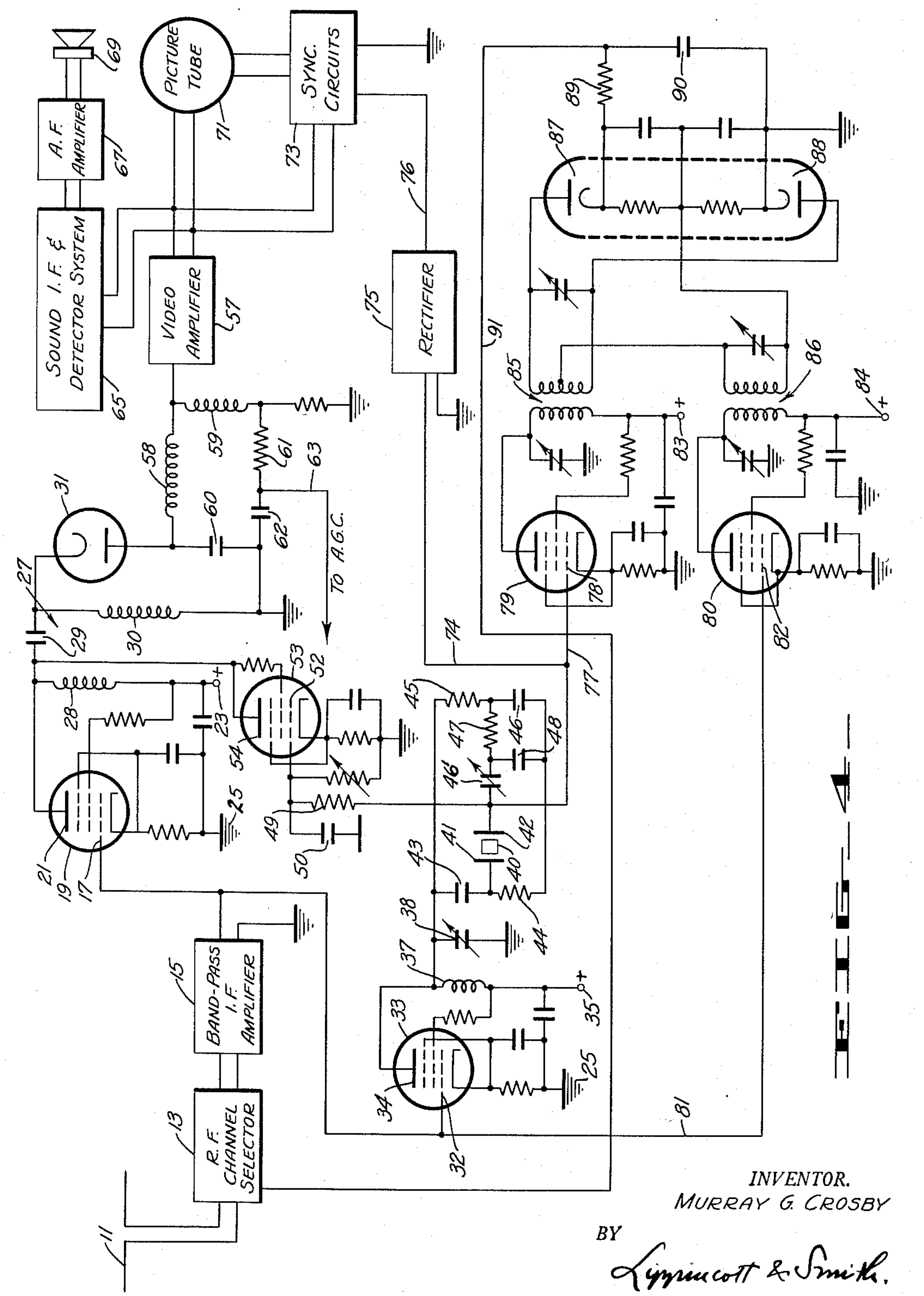
Fig. 4 is a circuit diagram, partly in block form, to illustrate one form of the signal receiver of this invention.

Referring now to the showing in Fig. 4 of the drawings, video and audio signals are received on any suitable form of circuit or signal channel such as that designated illustratively by the dipole 11. These received signals are then supplied to an R. F. channel selector, conventionally represented at 13. This R. F. channel selector generally includes one or more R. F. stages, the local oscillator (together with its reactance tube to respond to AFC voltages in many instances), and also the usual converter tube. When signals are so received they are then converted to intermediate frequency signals. These intermediate frequency signals which include both the video and the accompanying audio then may be passed through the band pass intermediate frequency amplifier 15.

In the form illustrated, the signals in the band pass I. F. amplifier 15 will include the video signals appearing as amplitude modulations of the carrier and the audio signals appearing as frequency modulations of a carrier frequency spaced in a fixed mean frequency separation from the video carrier. The video carrier modulation appears, as hereinbefore stated, in accordance with the vestigial side band transmission methods now customarily adopted by existing operational standards. The intermediate frequency output from the band pass I. F. amplifier is supplied to the grid or control electrode 17 of the detector driver tube represented as the pentode 19. This tube is supplied with operating voltage for its plate or anode electrode 21 from a source (not shown) with its positive terminal connected to the terminal point 23 so that the applied voltages are between the anode and ground 25. The output from the tube 19 is supplied to a filter network 27 comprising inductances 28 and 30 coupled through the condenser 29 which collectively are tuned to provide the desired pass band. The signals passed through the network 27 are supplied to the diode 31 for detection.

A portion of the signal output from the band pass I. F. amplifier 15 is also supplied to the grid or control electrode 32 of the carrier filter driver tube 33, which is usually also of the pentode variety. This tube 33, like the tube 19, has its plate or anode 34 supplied with positive voltage from a source (not shown) connected at the terminal point 35 so that the operating voltage to the tube is supplied between the anode 34 and ground 25. Tube 33, like tube 19, is biased in the manner indicated by the bypassed cathode resistor. The output from the tube 33 is supplied to a tuned circuit comprising the inductance 37 and condenser 38 which together are tuned to the video carrier frequency output from the I. F. amplifier. Output signals from the tube 33 are connected to drive the crystal filter network comprising the crystal 40 held between the holder plates 41 and 42. Neutralization of the electrode capacity of the crystal 40 is provided through a pair of phase shift networks. The crystal is driven by the phase shift network including the condenser 43 and the resistor 44 which shifts the phase of the crystal drive approximately 90 degrees in the leading direction. The neutralizing energy fed to the neutralizing condenser 46' is obtained from the two-stage phase shifter comprising resistor 45 and the condenser 46 on the one hand, and the resistor 47 and the condenser 48 on the other hand. This two-stage phase shifter shifts the phase of the neutralizing energy so that it lags by approximately 90 degrees. The combination of the lead of 90 degrees applied to the filter through condenser 43 and resistor 44, and the lag of 90 degrees provided by the two filters comprising resistors 45 and 47 and condensers 46 and 48 develops a phase difference of 180 degrees between the crystal drive energy and the neutralizing energy so that the neutralizing condenser 46' may be adjusted to neutralize the holder capacity.

In the practical case, it often develops that the phase shift introduced by condenser 43 and resistor 44 is supplied less than 90 degrees so that to obtain a full 180 degree phase difference between the drive and neutralizing energy the use of the two-stage phase shift circuit in the neutralizing connection becomes desirable because under this condition the phase shift brought about in the neutralizing action may be caused to be slightly more than 90 degrees.

The output from the crystal filter 40 is then supplied through the phase shifter circuit comprising resistor 49 and condenser 50 to the grid or control electrode 52 of a detector driver tube in the form of a pentode 53. This tube has its plate or anode 54 connected in common with that corresponding element of the driver tube 19. In the operation of the system, the phase shift network 49, 50 is adjusted so that the phase of the added carrier frequency developed from the crystal 40 will be in phase with the phase of the carrier present in the original I. F. signal modulation supplied to the grid or control electrode 17 of the tube 19. By adjusting the amplification obtained within the tube 53 with respect to that obtained within the tube 19, the desired degree of carrier exaltation may be obtained.

As shown, the tubes 19 and 33 are energized from the output of the band pass I. F. amplifier 15 but it should be appreciated that in some instances the amplification may be obtained in tubes such as 19 and 33 without requiring amplification at the point 15 in the system, in which event the tubes could be energized directly from the selector 13.

The output signals from the picture detector 31 are then supplied to a suitable video amplifier 57 for amplification. Suitable series and shunt peaking is provided by the inductance elements 58 and 59, and there is an R. F. bypass through the condenser 60 to ground as indicated. Automatic gain control voltages may readily be developed across the time constant network comprising resistor 61 and condenser 62 so as to be fed between conductor 63 to suitable portions of the circuit where gain control levels are to be established. These may be in the audio selector or the band pass I. F. amplifier, or both if desired. The automatic gain control potential will be comprised of energy predominantly due to the picture or video carrier itself and will thus be quite independent of the degree of picture modulation. Accordingly, the automatic gain control system responds substantially to the picture carrier level only and is not upset by variations in the depth of modulation. This provides a particular and a unique advantage in the system which cannot be had with the normal type of gain control which is generally upset by variations in picture modulation to an extent such that improper rendering of the light and dark views from the picture are obtained.

The output signals from the video amplifier 57 provide video frequencies in the range of substantially from zero frequency or D. C. up to approximately four megacycles with the addition, of course, of the 4.5 megacycle intermediate frequency which represents the frequency separation between the video and audio carriers. This 4.5 megacycle intermediate frequency may then be supplied to the sound I. F. and detector system, conventionally represented at 65.

At this point in the system the sound signals are detected according to the herein-assumed and so-called intercarrier type of sound signal selections by detecting the frequency modulation of the 4.5 megacycle beat. The signal output thus derived from the sound I. F. and detector system 65 is then suitably amplified in audio frequency amplifier 67, likewise of conventional type, and fed to the sound reproducer or loudspeaker conventionally represented at 69.

The output of the video amplifier 57 is also supplied to the picture-producing tube, which has been conventionally shown at 71. This tube is of the usual cathode ray type in which the image is recreated on the luminescent target or screen for observation either directly or by way of projection methods. Picture synthesizing information is derived according to the usual methods of transmission through the line and field synchronizing impulses which appear as modulations of the video carrier.

The picture intensity representations are controlled by way of the usual cathode ray beam modulation. Deflection in the high-speed direction, that is, the line frequency deflection, is established through the use of conventional forms of synchronizing signal selection diagrammatically represented at 73, with the line frequency control information derived by purely conventional line frequency selection circuits.

It was pointed out above that the lower frequency modulations (such as the 60 cycle field deflection signals) appear along with the picture carrier and this modulation range has been schematically represented by Fig. 2. It is readily possible to make a detection of the crystal carrier filter output corresponding to that supplied for the tube 53. Accordingly, with the field or vertical deflection frequency being in the low-frequency range of the order of 60 cycles and the carrier filter being modulated by these low frequencies, the lead or conductor 74 may be connected to receive the crystal output and supply it to a suitable rectifier 75, wherein the carrier filter output is detected. The detected output is substantially the vertical synchronizing signal energy and hence this provides a convenient means to separate the synchronizing signal information of the vertical and the horizontal characters one from the other without the expenditure of highly selective separating circuits of the more conventional type. The output of the rectifier 75 is then supplied by conductor 76, for instance, through the synchronizing circuits 73 to control the cathode ray beam deflection in the picture-producing tube 71.

It was pointed out also in the earlier portion of this description that automatic frequency control is an important aspect of this invention. To this end, the picture carrier energy obtainable as an output from the crystal filter 40 is also supplied by way of conductor 77 to the grid or control electrode 78 of one of a pair of pentode selector tubes 79 and 80. The unfiltered intermediate frequency energy corresponding to that energy is supplied to the grid or control electrode 32 of the tube 33 and also supplied by way of the conductor 81 to the grid or control electrode 82 of second tube 80 of the pentode variety. Plate or operating voltages for the tubes 79 and 80 are supplied at the terminal points 83 and 84 in normal manner from suitable and appropriate sources not shown. Transformers 85 and 86 couple respectively the output of the tubes 79 and 80 to the portions 87 and 88 of the differential phase detector circuit. The output of the phase detector is the familiar "S-shaped" AFC characteristic which has a selectivity comparable to the selectivity of the crystal filter 40 and with a zero center point at the peak of the carrier filter.

The time constant network comprising the resistor 89 and the condenser 90 feeds this automatic frequency control potential by way of the conductor 91 to a reactance tube (not shown) of the high frequency oscillator included in the R. F. channel selector 13. This form of reactance tube is well known and is generally of a type similar to that form of reactance tube normally used to control frequency in the usual form of F. M. transmitter, or may be the form of reactance tube used to control the sine wave oscillator frequency in the now well-known form of so-called "synchrolock" types of line deflection systems for presently marketed television receiver sets. In this form of operation the reactance tube, for instance, may be of the general variety disclosed by U. S. Patent No. 2,374,265, granted April 24, 1945, to Baker and Hawkins. This form of arrangement is considered to be so well known in the art as not to require other than diagrammatic block illustration at this point.

While the diode detector 31 has been illustrated as a part of this invention, it will be apparent to those skilled in the art that the multigrid types of exalted carrier combining detector may readily be used as an alternative. In the multigrid type system the carrier energy is fed upon one grid of the multigrid detector and unfiltered signal energy is supplied to the other grid of the tube. Both grids are biased to the linear portion of their characteristic so that there is no detection when a signal is fed to one grid alone. Consequently, a detector which is arranged in this way may be considered generally as a linear modulator in which one grid controls the gain of the other grid in the manner of the ordinary amplitude modulator. So arranged the detected output from the multigrid type of detector circuit will be taken from the plate resistor of the multigrid tube and supplied to the video amplifier such as that shown at 57 so that the multigrid tube will be used as an alternative to the diode 31. Such detectors are shown as alternative to diode detectors in a paper by Murray G. Crosby published in the Proceedings of the Institute of Radio Engineers for September 1945, vol. 33, No. 9, pp. 581 et seq. As is there noted, where this form of detector is used the filtered carrier need not exceed the unfiltered carrier.

Figure 5:
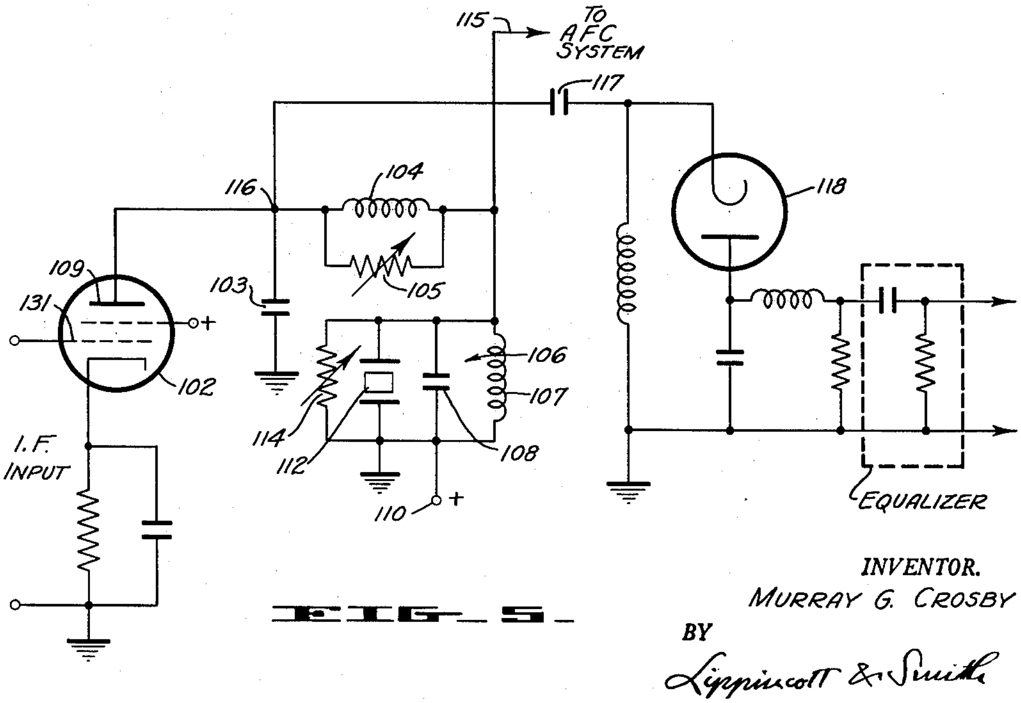
Fig. 5 is a modification of a portion of the circuit of Fig. 4.

In Fig. 5 there has been shown a simplified method of obtaining carrier exaltation and side band amplifier characteristics of the form shown by Fig. 2. The arrangement depicted by Fig. 5 is illustrative of a circuit where the I. F. input is supplied upon the grid or control electrode 131 of an intermediate frequency amplifier tube 102. In the plate circuit of this tube there has been included an impedance inverting network comprising the condenser 103, the inductance 104 shunted by the resistor 105, and a part of the capacity of the tuned circuit 106. The tuned circuit 106 comprises the inductance 107 shunted by the capacity 108 with plate voltage being supplied to the plate or anode 109 of the tube 102 through the inductance elements 107 and 104 from a suitable source not shown connected at the terminal point 110. The crystal 112 is placed across the tuned circuit 106 and the variable resistance 114 is used to control the damping of the tuned circuit 106.

As can be appreciated, the tuned circuit 106 is tuned to resonate at the crystal frequency which likewise is chosen as the picture carrier frequency which, when transformed into the impedance inverting network will appear as a high impedance point giving a high amplitude in the immediate vicinity of the picture carrier frequency so that an overall characteristic such as that shown in Fig. 2 is obtained. This might further be explained by pointing out that when the crystal frequency is reached it becomes a low impedance and the circuit looks at a high impedance so that the gain is high and otherwise the crystal is a high impedance and looks at a low impedance circuit so that the gain is less.

The circuit of Fig. 5 is then so designed that at the terminal point 115 a voltage is supplied to the automatic frequency control system. Likewise, at the point 116, or in other words, across the condenser 103, the resultant voltage there developed is supplied through the condenser 117 to the detector 118 in a manner substantially like that shown in connection with the showing of Fig. 4. It thus will be appreciated that the modification of Fig. 5 gives a relatively simple circuit to provide the necessary carrier exaltation signal amplification and automatic frequency control.

Various other modifications and changes, of course, possible, and should be considered as falling within the general spirit and scope of this disclosure, provided they are clearly within the meaning and interpretation of the claims hereinafter appended.

Having now described my invention, I claim:

1. Receiver apparatus particularly for television signals transmitted on one carrier by vestigial sideband methods and accompanied by audio signals transmitted upon a separate carrier frequency at fixed spacing comprising a signal circuit to connect the received video and accompanying audio signals to intermediate frequency signals, a signal detector, a first signal channel to supply received audio and video signals to the detector, a filter circuit to derive the video intermediate frequency carrier from the received signals, a second signal channel including means to derive the video intermediate frequency carrier, amplifier means to supply the derived video intermediate frequency video carrier in controlled phase and amplitude manner to the detector concomitantly with the signals in the first signal channel, and video and audio utilization circuits connected to receive the output signals from the detector.

2. Television receiver apparatus for receiving video and audio signals transmitted as modulations of separate carrier frequencies with the video modulations transmitted by vestigial sideband methods comprising a signal circuits for receiving each of the video and the accompanying audio signals transmitted upon the separate carrier frequencies, a signal detector, a first signal channel to supply received audio and video intermediate frequency signals for detection, a filter circuit to derive the video intermediate frequency carrier from the received signals, a second signal channel to supply the derived video intermediate carrier frequency in common with the signals in the first signal channel to the detector, amplitude control means to establish the relative magnitude of the signals in the second and first signal channels to control the degree of exaltation of the carrier in the combined signals supplied to the detector, and audio and video utilization circuits connected to respond to the signal detector output.

3. Television receiver apparatus for receiving video signal modulations transmitted upon one carrier and accompanying audio signal modulations transmitted upon a separate carrier spaced therefrom at a frequency separation slightly exceeding the maximum modulation of the video carrier in the direction toward the audio carrier comprising a signal circuit for receiving each of the video and the accompanying audio signals and to derive therefrom video and audio intermediate frequency signals, a signal detector, a first signal channel to supply received audio and video intermediate frequency signals to the detector, a filter circuit to derive the video intermediate frequency carrier from the received signals, a second signal channel to supply the derived intermediate frequency carrier to the detector concomitantly with the signals in the first signal channel, a phase shifter to control the phase of the signals in the second signal channel relative to the first signal channel, amplitude control means to establish the relative magnitude of the signals in the second and first signal channels to control the degree of exaltation of the carrier in the combined signals supplied to the detector, and audio and video utilization circuits connected to respond to the signal detector output.

4. Television receiver apparatus comprising a signal circuit for receiving and converting each of amplitude modulated video and accompanying frequency modulated audio signals each transmitted upon a separate carrier frequency into intermediate frequency signals, a signal detector, a first signal channel to supply the intermediate frequency signals to the detector, a selection circuit to derive the video intermediate frequency carrier from the intermediate frequency signals, a second signal channel to supply the derived intermediate frequency carrier to the detector concomitantly and additively with the signals supplied from the first signal channel, a phase shifter to control the phase of the signals in the second signal channel relative to the signals in the first signal channel, amplitude control means to establish the relative magnitude of the signals in the second and first signal channels to control the degree of exaltation of the carrier in the combined signals supplied to the detector, sound reproducer means including a discriminator and an amplifier to produce sound from the audio signals, video utilization circuits connected to respond to the detector signal output to develop image reproductions, a second rectifier unit connected to receive its input only from the derived intermediate frequency carrier and the therewith closely associated low frequency components, and means to utilize the rectified output of the second rectifier to control the picture reproduction in one of its coordinates.

5. The receiver circuit claimed in claim 4 comprising, in addition, a high frequency synchronizing signal separator for selecting the high frequency synchronizing information from the detected combined signals, and means to control the reproduction of the video signals in the second of its coordinates from the high frequency synchronizing signals.

6. The receiver circuit claimed in claim 4 comprising, in addition, a time constant network including resistance and capacity elements connected to the output of the signal detector to produce an automatic gain control voltage variable primarily under the control of the carrier only.

7. Television receiver apparatus comprising a signal circuit for receiving video and accompanying audio signals appearing as modulations of separate carrier frequencies and converting each of the said video and audio signals to intermediate frequencies, a signal detector, a first signal channel to supply the received audio and video intermediate frequency signals to the detector, a filter circuit to derive the video intermediate frequency carrier from the received signals, a second signal channel to supply in selected phase and amplitude the derived intermediate frequency carrier to the detector concomitantly with the signals in the first signal channel, a phase detector connected to receive each of the intermediate frequency signals and the filtered intermediate frequency carrier signals and to produce an output voltage indicative of frequency change, means to control the conversion of the received signals to intermediate frequency under the control of the phase detector output voltage, and audio and video utilization circuits connected to respond to the signal detector output.

8. Television receiver apparatus comprising a signal circuit for receiving video signals and converting said signals to an intermediate frequency range, a signal detector, a signal channel to supply the intermediate frequency range video signals to the detector, an impedance inverting network connected to the intermediate frequency signal channel to derive the intermediate frequency carrier from the said signals, a crystal tuned to the intermediate frequency carrier to provide a rejection dip at the derived intermediate frequency carrier which appears as a high impedance point to provide high amplitude in the vicinity of the video carrier when transformed through the impedance network so as to establish an exaltation of the carrier in the intermediate frequency signals supplied to the detector, and video utilization circuits connected to respond to the signal detector output.

9. Television receiver apparatus comprising a signal circuit for receiving each of amplitude modulated video and accompanying frequency modulated audio signals transmitted upon separate carrier frequencies and converting each of said signals into intermediate frequency signals, a signal detector, a first signal channel to supply the intermediate frequency signals to the detector, a selection circuit to derive the video intermediate frequency carrier from the intermediate frequency signals, a second signal channel to supply the derived intermediate frequency carrier to the detector concomitantly and additively with the signals supplied the first signal channel, a phase shifter to control the phase of the signals in the second signal channel relative to the signals in the first signal channel, a circuit including a discriminator, an amplifier and sound reproducer means to produce sound from the audio signals, video utilization circuits connected to respond to the detector signal output to develop image reproductions, a time constant circuit connected to the output of said signal detector to derive an automatic gain control voltage measured substantially by the developed intermediate frequency carrier, a second rectifier unit connected to receive its input only from the derived intermediate frequency carrier and the therewith associated low frequency components, and means to utilize the rectified output of the second rectifier to control the picture reproduction in one of its coordinates.

10. Television receiver apparatus comprising a signal circuit for receiving each of amplitude modulated video and accompanying frequency modulated audio signals transmitted upon separate carrier frequencies and converting each of said signals into intermediate frequency signals, a signal detector, a first signal channel to supply the intermediate frequency signals to the detector, a selection circuit to derive the video intermediate frequency carrier frequency from the intermediate frequency signals, a second signal channel to supply the derived intermediate frequency carrier to the detector concomitantly and additively with the signals supplied the first signal channel, a phase shifter to control the phase of the signals in the second signal channel relative to the signals in the first signal channel, amplitude control means to establish the relative magnitude of the signals in the second and first signal channels to control the degree of exaltation of the carrier in the combined signals supplied to the detector, a circuit including a discriminator, an amplifier and sound reproducer means to produce sound from the audio signals, video utilization circuits connected to respond to the detector signal output to develop image reproductions, a time constant circuit connected to the output of said signal detector to derive an automatic gain control voltage measured substantially by the developed intermediate frequency carrier, a second rectifier unit connected to receive its input only from the derived intermediate frequency carrier and the therewith associated low frequency components, and means to utilize the rectified output of the second rectifier to control the picture reproduction in one of its coordinates.

References Cited in the file of this patent

UNITED STATES PATENTS

| | | |
|---|---|---|
| 1,847,190 | Morrison | Mar. 1, 1932 |
| 1,842,898 | Bellescize | Jan. 26, 1932 |
| 2,138,746 | Robinson | Nov. 29, 1938 |
| 2,171,678 | Weyers | Sept. 5, 1939 |
| 2,231,704 | Curtis | Feb. 11, 1941 |
| 2,266,517 | Rust et al. | Dec. 16, 1941 |
| 2,280,187 | Case | Apr. 21, 1942 |
| 2,433,350 | Earp | Dec. 30, 1947 |